(12) United States Patent
Sajassi et al.

(10) Patent No.: US 9,118,572 B2
(45) Date of Patent: Aug. 25, 2015

(54) REDUNDANCY FOR INTER-AS L2VPN SERVICE WITH OPTIMAL FORWARDING

(71) Applicant: Cisco Technology, Inc., San Jose, CA (US)

(72) Inventors: Ali Sajassi, San Ramon, CA (US); Samer Salam, Vancouver, CA (US); Sami Boutros, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 162 days.

(21) Appl. No.: 14/022,382

(22) Filed: Sep. 10, 2013

(65) Prior Publication Data

US 2015/0071080 A1    Mar. 12, 2015

(51) Int. Cl.
*H04L 12/733*    (2013.01)

(52) U.S. Cl.
CPC .................................. *H04L 45/126* (2013.01)

(58) Field of Classification Search
CPC . H04L 61/10; H04L 61/103; H04L 29/12018; H04L 45/00; H04L 45/02; H04L 45/04; H04L 45/16; H04L 45/48; H04L 45/74
USPC ........... 370/37, 238, 254, 255, 256, 389, 397, 370/399; 709/238–242
See application file for complete search history.

(56) References Cited

U.S. PATENT DOCUMENTS

| | | | |
|---|---|---|---|
| 7,633,956 B1 | 12/2009 | Parandekar et al. | |
| 7,643,409 B2 | 1/2010 | Voit et al. | |
| 7,697,439 B2 | 4/2010 | Martini et al. | |
| 7,715,310 B1 | 5/2010 | Sajassi et al. | |
| 8,175,078 B2 | 5/2012 | Voit et al. | |
| 8,953,590 B1 * | 2/2015 | Aggarwal et al. | 370/389 |
| 2010/0020797 A1 * | 1/2010 | Casey et al. | 370/390 |
| 2013/0201986 A1 | 8/2013 | Sajassi et al. | |

OTHER PUBLICATIONS

Mohapatra, et al., "The Accumulated IGP Metric Attribute for BGP", Network Working Group, Internet Draft: draft-ietf-idr-aigp-10.txt, May 23, 2013, 14 pages, Internet Engineering Task Force Trust.
Sajassi, et al., "BGP MPLS Based Ethernet VPN", Network Working Group, Internet Draft, draft-ietf-l2vpn-evpn-03, Feb. 2013, 47 pages, The Internet Engineering Task Force Trust.
Sajassi, et al., "PBB-EVPN", Internet Working Group, Internet Draft, draft-ietf-l2vpn-pbb-evpn-04, Feb. 2013, 20 pages, The Internet Engineering Task Force Trust.

* cited by examiner

*Primary Examiner* — Pao Sinkantarakorn
*Assistant Examiner* — Stephen Steiner
(74) *Attorney, Agent, or Firm* — Parker Ibrahim & Berg LLC; James M. Behmke; Stephen D. LeBarron

(57) ABSTRACT

In one embodiment, a particular autonomous system border router (ASBR), in a control-plane media access control (MAC) learning (CPML) network, discovers other ASBRs in the CPML network, the particular ASBR and other ASBRs interconnected with respective ASBRs of a data-plane MAC learning (DPML) network. The particular ASBR calculates one or more internal shortest path first (SPF) trees rooted respectively at each of the other ASBRs in the CPML network, and upon receiving a MAC advertisement route for a given MAC address with a given next-hop IP address, it may determine a distance from the particular and each other ASBR in the CPML network to the given IP address based on the internal SPF trees. In response to the distance from the particular ASBR being shorter than the distance from each other ASBR, the particular ASBR is designated as a designated forwarder (DF) for traffic sourced from the given MAC address.

20 Claims, 17 Drawing Sheets

REDUNDANCY FOR INTER-AS L2VPN SERVICE WITH OPTIMAL FORWARDING

TECHNICAL FIELD

The present disclosure relates generally to computer networks, and, more particularly, to redundancy for inter-autonomous-system (inter-AS) layer-2 virtual private network (L2VPN) service.

BACKGROUND

Service Providers (SPs) offering layer-2 virtual private network (L2VPN) services over national or global networks encounter scenarios where a given service spans Autonomous System (AS) boundaries. The AS border routers (ASBRs) interconnecting the domains are often geo-redundant, with a large geographic distance in between. Service providers sometimes have a requirement to provide optimal forwarding not just for intra-AS but also for inter-AS traffic. The optimal forwarding for inter-AS traffic may be important because of a geo-redundancy requirement, and because non-optimal inter-AS forwarding may cause excess delay due to the often large geographic distance between the two ASBRs in that AS.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
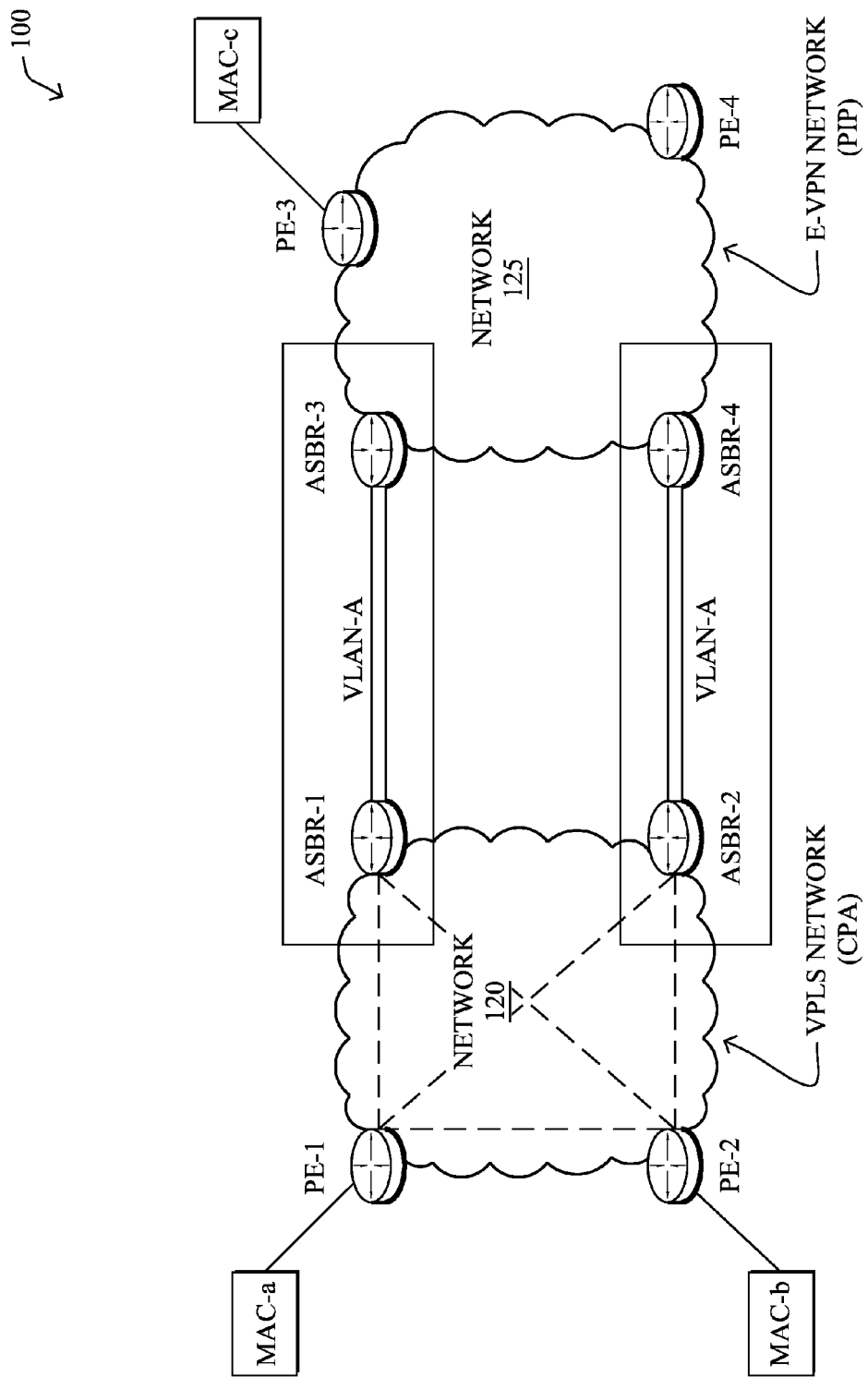
FIG. 1 illustrates an example computer network.

According to one or more embodiments of the disclosure, a particular autonomous system border router (ASBR), in a control-plane media access control (MAC) learning (CPML) network, discovers one or more other ASBRs in the CPML network, where the particular ASBR and one or more other ASBRs are interconnected with respective ASBRs of a data-plane MAC learning (DPML) network. The particular ASBR calculates one or more internal shortest path first (SPF) trees rooted respectively at each of the other ASBRs in the CPML network, such that upon receiving a MAC advertisement route for a given MAC address with a given next-hop Internet Protocol (IP) address, it may determine a distance from the particular ASBR and from each other ASBR in the CPML network to the given IP address based on the internal SPF trees. In response to the distance from the particular ASBR being shorter than the distance from each other ASBR, the particular ASBR is designated as a designated forwarder (DF) for traffic sourced from the given MAC address, accordingly.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

FIG. 1 is a schematic block diagram of an example computer network 100 illustratively comprising nodes/devices, such as a plurality of routers/devices interconnected by links or networks, as shown. For example, AS border routers (ASBRs) (e.g., ASBR1, ASBR2, ASBR3, and ASBR4) may allow for communication between two or more networks (ASes) 120 and 125 via one or more links (e.g., ASBR1/ASBR3 and ASBR2/ASBR4) as shown (e.g., to extend virtual local area networks or "VLANs"). Each network/AS may be connected via one or more provider edge (PE) devices (e.g., PE-1 and PE-2 in network 120, PE-3 and PE-4 in network 125), which provides access to one or more devices (e.g., within customer networks), such as "MAC-a", "MAC-b", "MAC-c", etc. Illustratively, though not as a limitation, network 120 is shown as a virtual private LAN service (VPLS) network, and network 125 is shown as an Ethernet VPN network as described below. Those skilled in the art will understand that any number of nodes, devices, links, etc. may be used in the computer network, and that the view shown herein is for simplicity. Those skilled in the art will also understand that while the embodiments described herein are described generally for inter-AS operation, the present disclosure may apply to any similar inter-domain network configuration where similar techniques would be suitable.

Data packets (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol.

Figure 2:
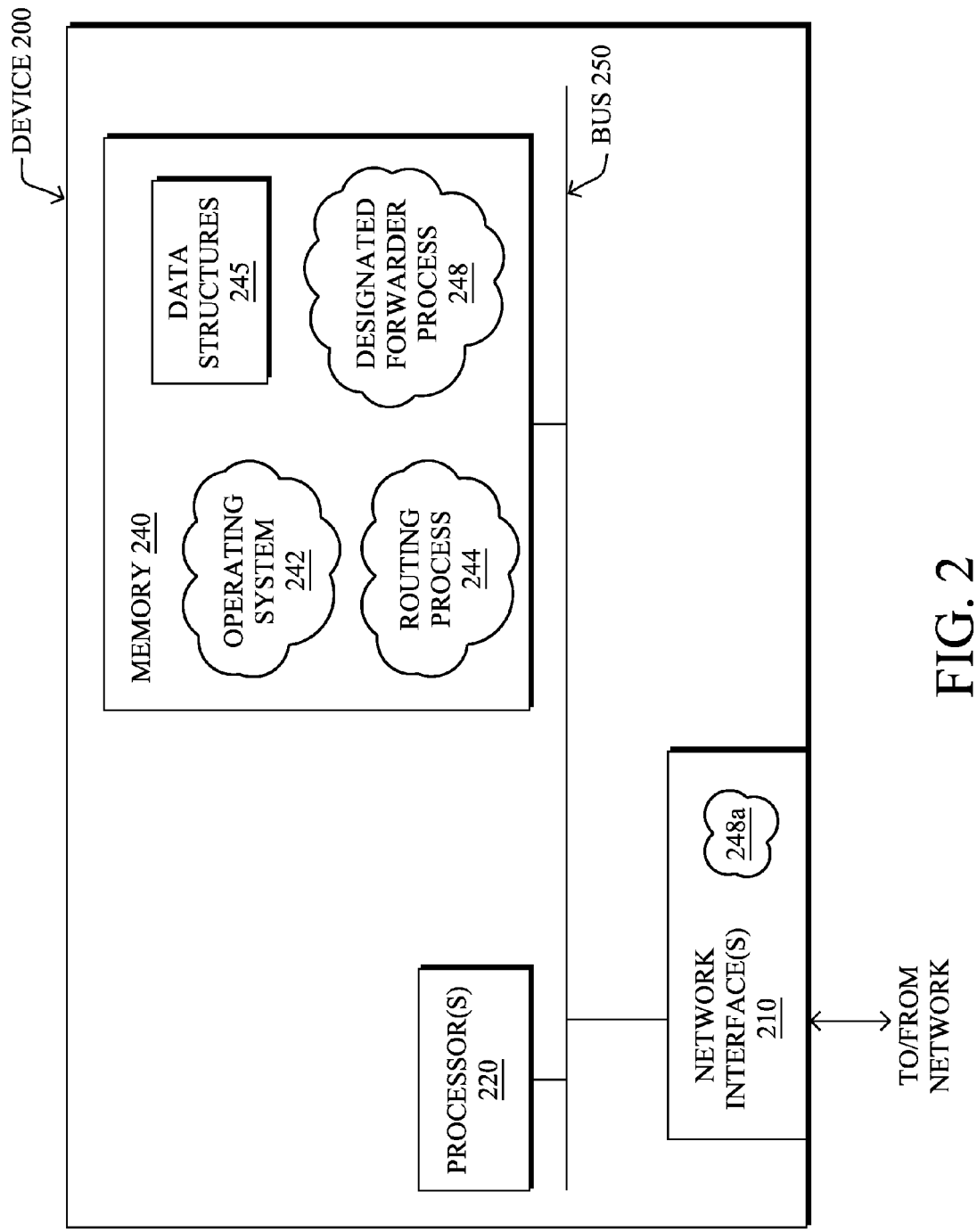
FIG. 2 illustrates an example network device/node.

FIG. 2 is a schematic block diagram of an example node/device 200 that may be used with one or more embodiments described herein, e.g., as any of the routers as shown in FIG. 1, particularly the ASBRs. Device 200 comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for Virtual Private Network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc.), portions of which are typically resident in memory 240 and executed by the processor(s), functionally organizes the node by, inter alia, invoking network operations in support of software processes and/or services executing on the device. These software processes and/or services may comprise routing services 244 and an illustrative designated forwarder process 248, as described herein, which may alternatively be located within individual network interfaces (e.g., process 248a).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database containing, e.g., data used to make forwarding decisions. In particular, changes in the network topology may be communicated among routers 200 using routing protocols, such as the conventional OSPF and IS-IS link-state protocols (e.g., to "converge" to an identical view of the network topology). Notably, routing services 244 may also perform functions related to virtual routing protocols, such as maintaining VRF instances, or tunneling protocols, such as for Multi-Protocol Label Switching (MPLS), generalized MPLS (GMPLS), etc., each as will be understood by those skilled in the art.

Notably, E-VPN, e.g., as described in the IETF Internet Draft entitled "BGP MPLS Based Ethernet VPN"<draft-ietf-l2vpn-evpn>, introduces a solution for multipoint L2VPN services, with advanced multi-homing capabilities, using BGP for distributing customer/client media access control (MAC) address reach-ability information over the core MPLS/IP network. Also, IEEE Standard 802.1ah defines an architecture for Ethernet Provider Backbone Bridging (PBB), where MAC tunneling is employed to improve service instance and MAC address scalability in Ethernet as well as VPLS networks. Moreover, the IETF Internet Draft entitled "PBB-EVPN"<draft-ietf-12vpn-pbb-evpn> discusses how PBB can be combined with E-VPN in order to reduce the number of BGP MAC advertisement routes by aggregating Customer/Client MAC (C-MAC) addresses via Provider Backbone MAC address (B-MAC), provide client MAC address mobility using C-MAC aggregation and B-MAC sub-netting, confine the scope of C-MAC learning to only active flows, offer per site policies and avoid C-MAC address flushing on topology changes. In particular, PBB-EVPN (or "(PBB)E-VPN") accommodates interconnect of data centers running different technologies.

As noted above, Service Providers (SPs) offering layer-2 virtual private network (L2VPN) services over national or global networks encounter scenarios where a given service spans AS boundaries. The ASBRs interconnecting the domains are often geo-redundant, with a large geographic distance in between. For example, as shown in FIG. 1, an illustrative L2VPN technology in network/AS 125 is PBB-EVPN, whereas network/AS 120 uses VPLS (e.g., with either label distribution protocol (LDP) or BGP signaling). As also noted, service providers sometimes have a requirement to provide optimal forwarding not just for intra-AS but also for inter-AS traffic. The optimal forwarding for inter-AS traffic is important because of a geo-redundancy requirement, and because non-optimal inter-AS forwarding may cause excess delay due to the often large geographic distance between the two ASBRs in that AS.

To illustrate the requirement further with an example, consider the case where PE1 is equidistant (in the IGP) to ASBR1 and ASBR2, while PE3 is "closer" (in the IGP) to ASBR3 and PE4 is "closer" to ASBR4. Assuming there is a single L2VPN instance that spans PE1, PE3, and PE4, then the requirement is for PE1 to forward traffic destined to PE3 via ASBR1/ASBR3, and forward traffic destined to PE4 via ASBR2/ASBR4.

The dual-homing of the two ASes via two pairs of ASBRs creates challenges pertaining to the fact that network/AS 120 relies on data-plane MAC learning (as it runs VPLS). This is best explained with an example: If a source behind PE3 sends a multi-destination frame (e.g. an address resolution protocol (ARP) broadcast), then both ASBR3 and ASBR4 would receive the flooded traffic. If ASBR4 happens to be the Designated Forwarder (DF) for the VPN instance in question, then ASBR4 will forward the flooded traffic into network 120. This will confuse the VPLS PEs in network 120 since they will see the same MAC address originating from behind ASBR1 (via ASBR3) for unicast traffic, and showing up behind ASBR2 (via ASBR 4) for multi-destination traffic. For example on VPLS PE1, this results in the MAC address being toggled back and forth between the PE1-ASBR-1 pseudowire (PW) and PE1-ASBR2 PW.

Another problem regarding the example architecture relates to how to prevent duplicate delivery of frames that are flooded within the VPLS domain and that need to be forwarded into the PBB-EVPN domain.

Conventional techniques attempt to address the above problems by performing DF election based on a modulo function (e.g., VLAN modulo PE's ordinal—where the ordinal refers to the index of the PE in an ordered list of PE IP addresses), where DF filtering is applied in the core-to-segment direction, and only to multi-destination traffic. An alternative technology, e.g., a multi-homed network (MHN) running multiple spanning tree (MST) with per-VLAN load-balancing performs DF election in the same manner as just mentioned, but applies filtering in both the segment-to-core as well as the core-to-segment directions, and affects all traffic: multi-destination as well as unicast. Notably, neither of these technologies works for the example network architecture described above, as the first causes issues with the MAC learning on the VPLS PEs, and the second violates the baseline requirement to support optimal forwarding based on IGP distance.

Embodiments of the techniques described herein provide a mechanism to support multi-homed (e.g., dual-homed) interconnect of VPLS and PBB-EVPN domains with optimal forwarding using MAC-based DF filtering and IGP distance to determine the DF for traffic bound towards the VPLS domain. Illustratively, the techniques described herein may be performed by hardware, software, and/or firmware, such as in accordance with the designated forwarder process 248/248a, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, such as protocols typically operating on an ASBR in the environment described herein, and as such, may be processed by similar components understood in the art that execute those protocols, accordingly.

Operationally, DF election and filtering are handled differently depending on the direction of traffic flow:
a) From a "control-plane MAC learning" network 125 (e.g., PBB-EVPN) to a "data-plane MAC learning" network 120 (e.g., VPLS), or
b) From a "data-plane MAC learning" network 120 (e.g., VPLS) to a "control-plane MAC learning" network 125 (e.g., PBB-EVPN).

In particular, when applied in the PBB-EVPN to VPLS direction, the ASBRs on the PBB-EVPN side would discover each other via the exchange of the E-VPN Ethernet Segment routes (e.g., per <draft-ietf-l2vpn-evpn> mentioned above). Each ASBR may then calculate an IGP shortest path first (SPF) (or shortest path tree, SPT) rooted at its peer(s) (e.g., ASBR3 calculates an IGP SPF rooted at ASBR4, and vice versa). When an ASBR receives a MAC Advertisement route for a given MAC (M1) with next-hop IP address (IP1), it calculates the IGP distance from itself to IP1 as well as the IGP distance from its peer ASBR(s) to IP1. If the ASBR finds that its distance to IP1 is shorter, it designates itself as the DF for traffic sourced from M1. Otherwise, the peer ASBR would be the DF for said MAC address. This effectively ensures that an ASBR which is on the optimal forwarding path of unicast traffic from M1 is also the DF for multi-destination traffic originating from M1. Note that in this PBB-EVPN to VPLS direction, the ASBRs perform DF filtering based on the traffic's source MAC address.

Regarding the VPLS to PBB-EVPN direction, the DF election can be on a per-service-instance basis, since the PBB-EVPN PEs will perform control-plane based MAC learning. However, the ASBRs only filter multi-destination traffic in this direction (and not unicast traffic as was the case with MHN).

With the techniques described herein, the VPLS PEs' MAC tables will be stable, and shortest-path forwarding is guaranteed (generally) between the two domains.

Figure 3:
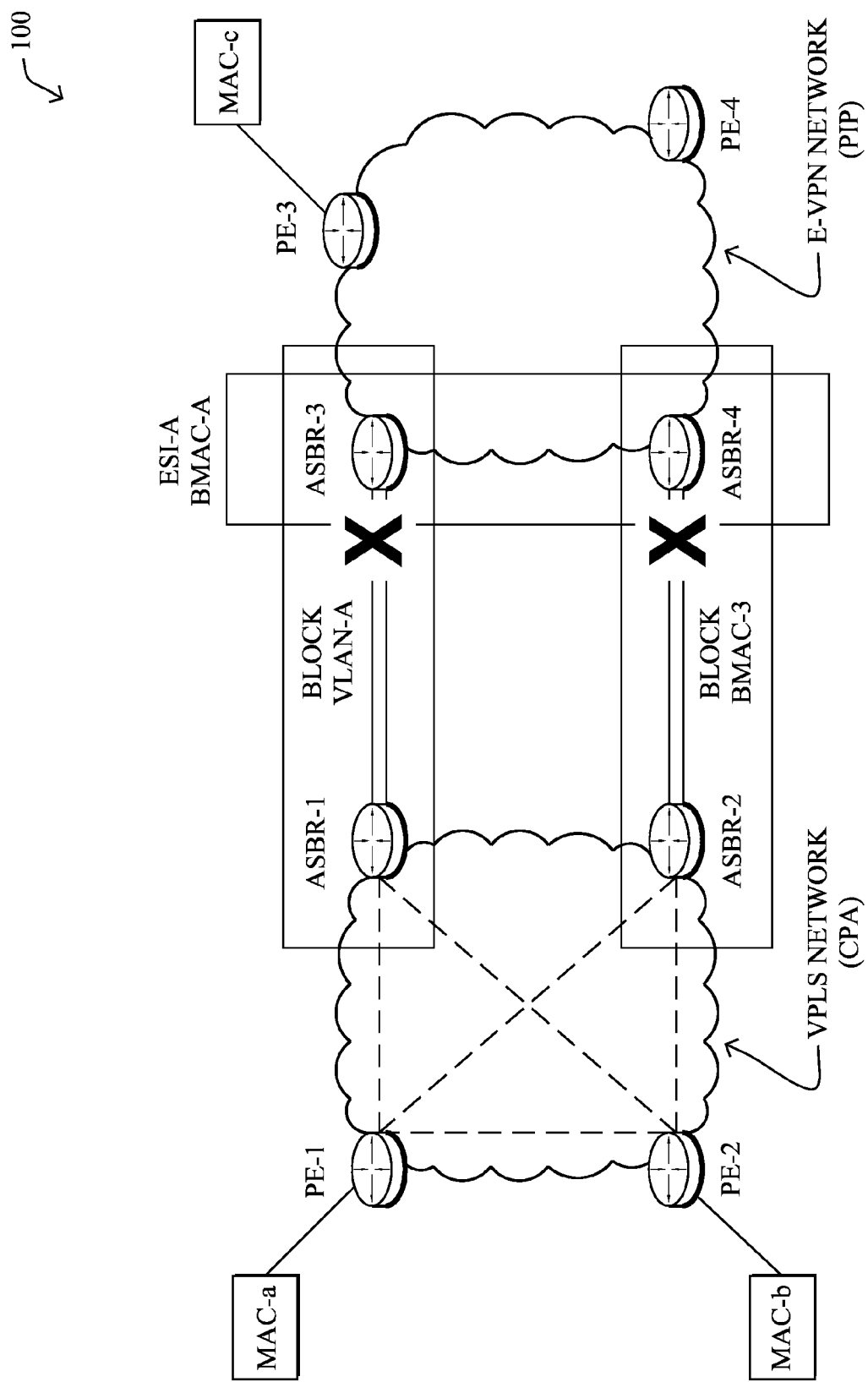
FIG. 3 illustrates an example designated forwarder configuration.

As an example of the techniques herein, FIG. 3 illustrates a blocking configuration for E-VPN outbound traffic, where DF election for PBB-EVPN outbound traffic is on a per-BMAC basis. In particular, for PBB-EVPN outbound traffic, instead of performing DF election for "BUM" (broadcast, unknown unicast, and multicast) traffic on a per-service (per-VLAN or Internet Service Identifier (ISID)) basis, the techniques herein perform it on a per-BMAC basis, using the IGP metric to decide which source BMAC to block on which ASBRs, as described above (i.e., block the B-MAC with the highest IGP cost (farthest away)). For PBB-EVPN inbound traffic, the DF election may still be performed on a per-service (per-VLAN or ISID) basis. In this manner, the PBB-EVPN outbound traffic is forwarded optimally from the start, thus all unicast traffic starts with an optimum forwarding between the two networks. Note that blocking is performed asymmetrically—per BMAC for PBB-EVPN outbound traffic and per VLAN or ISID for PBB-EVPN inbound traffic.

Figure 4A:
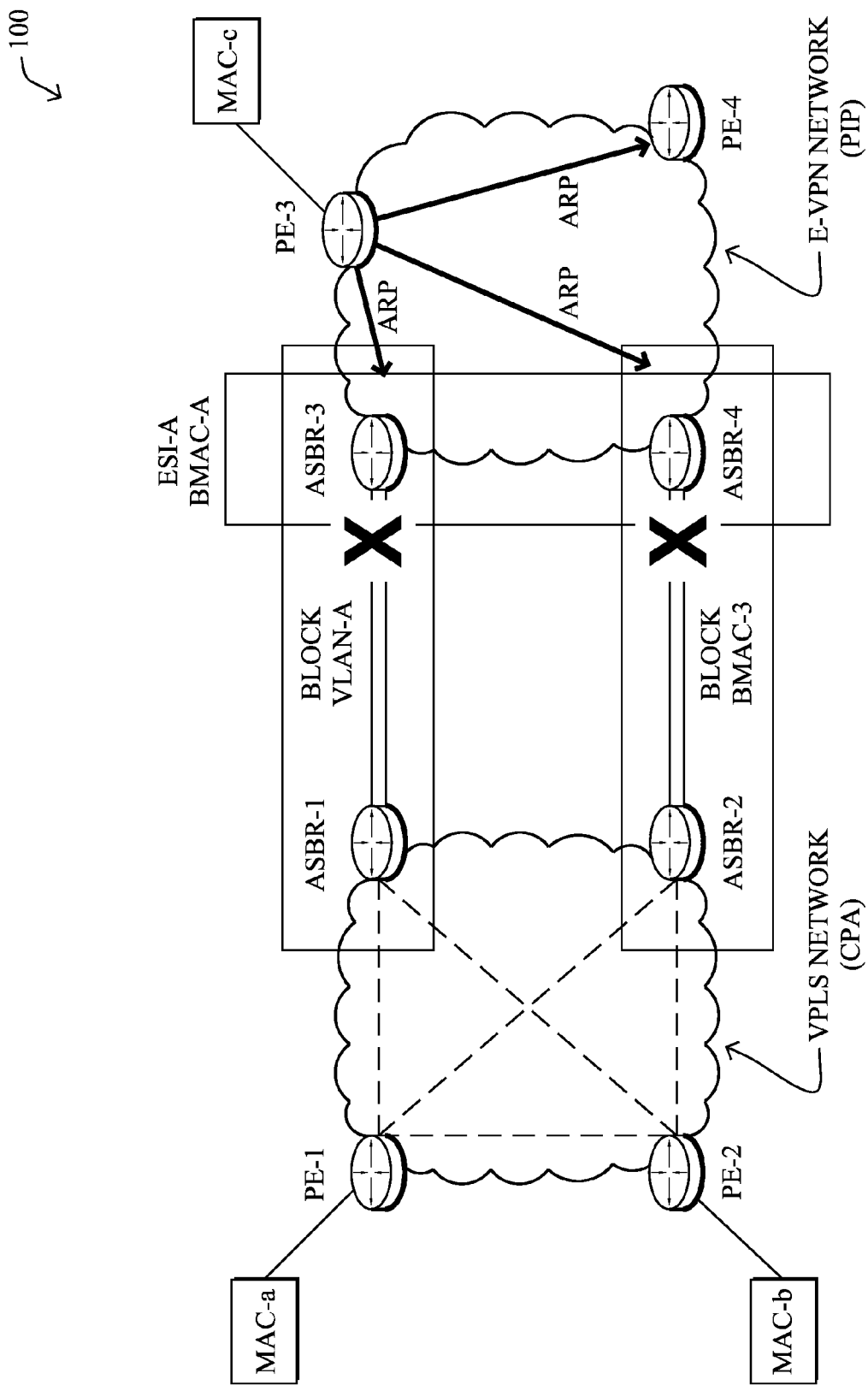
FIGS. 4A-4C illustrate an example address resolution protocol (ARP) message passing.
Figure 4B:
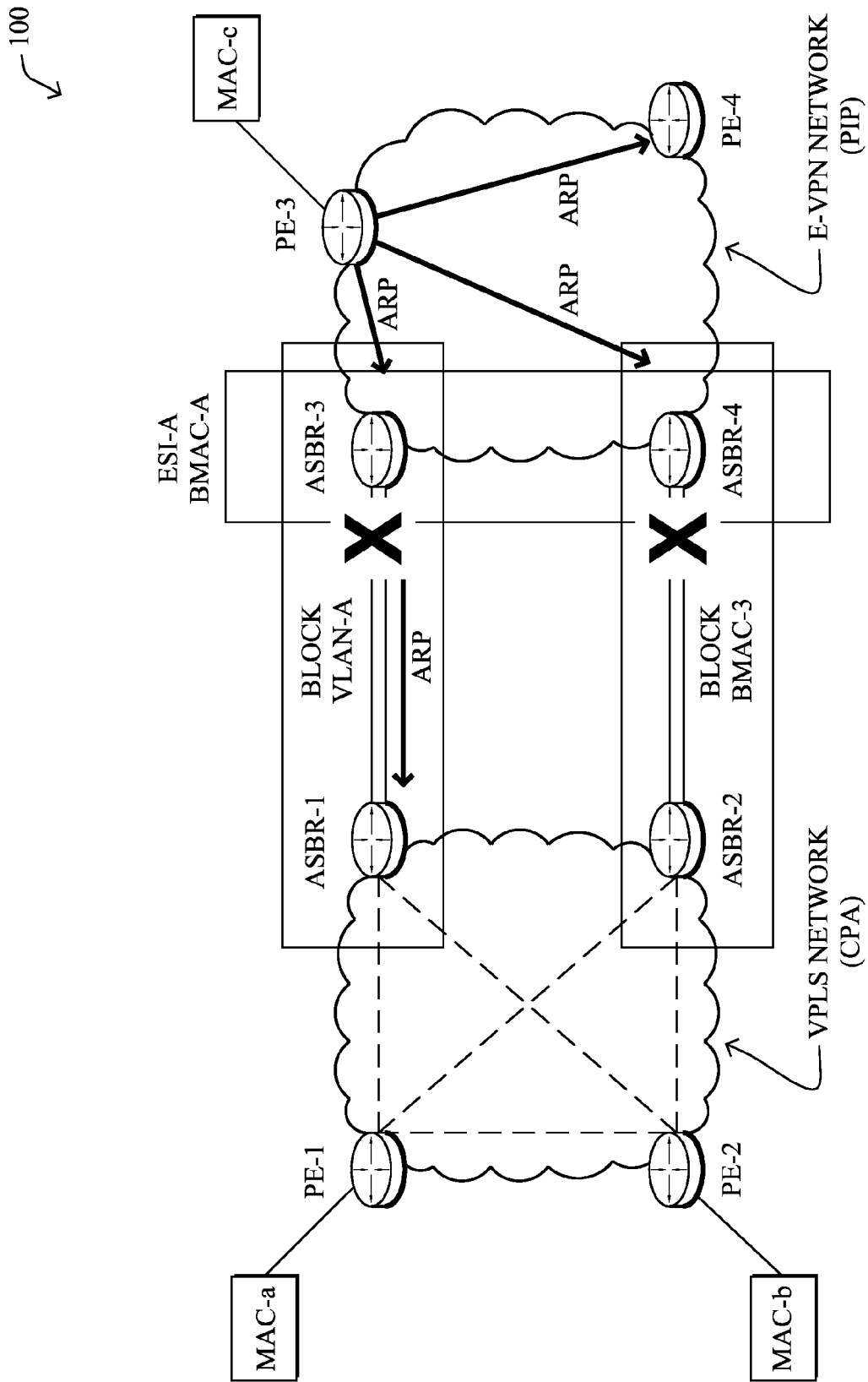
Figure 4C:
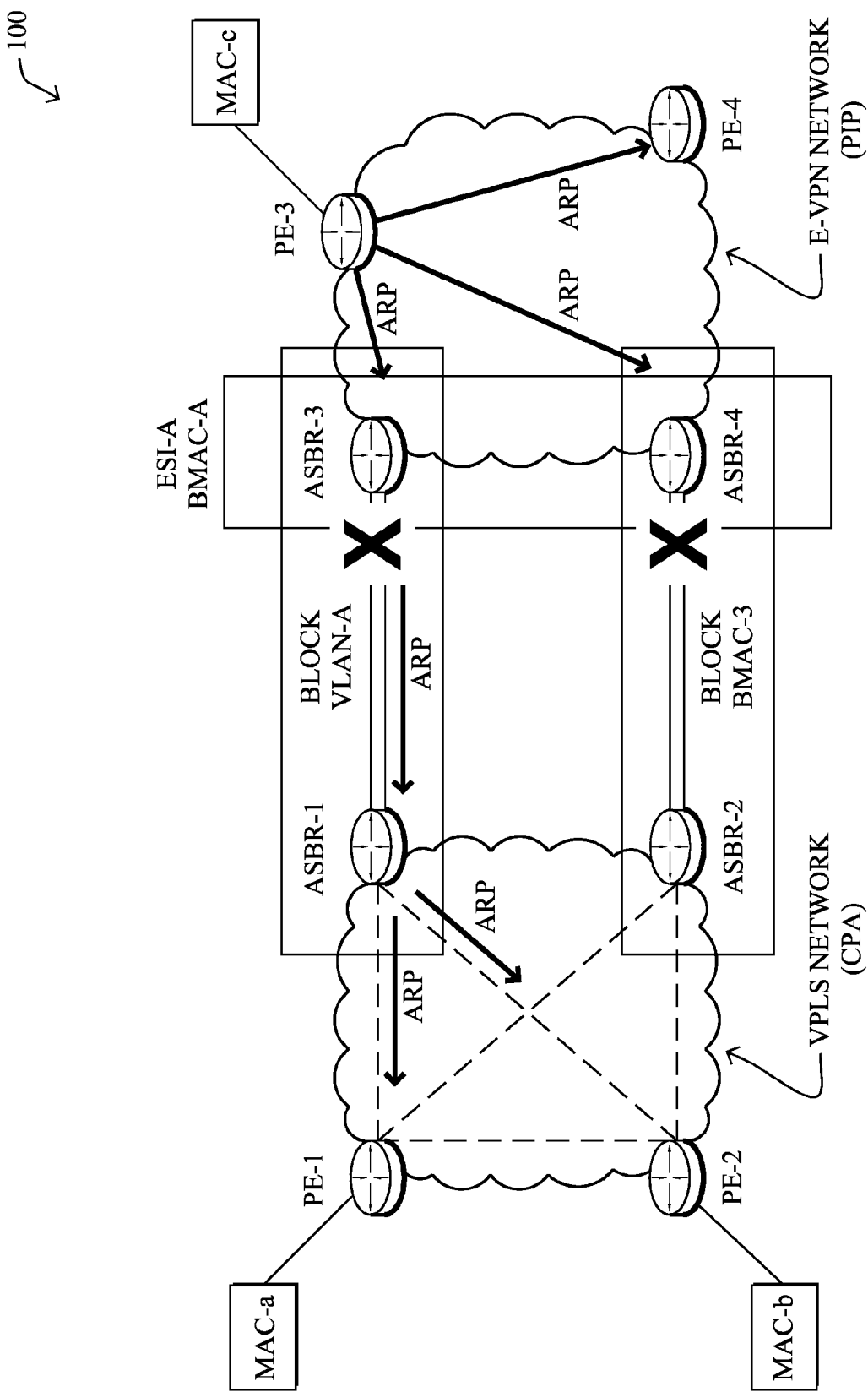
Figure 5A:
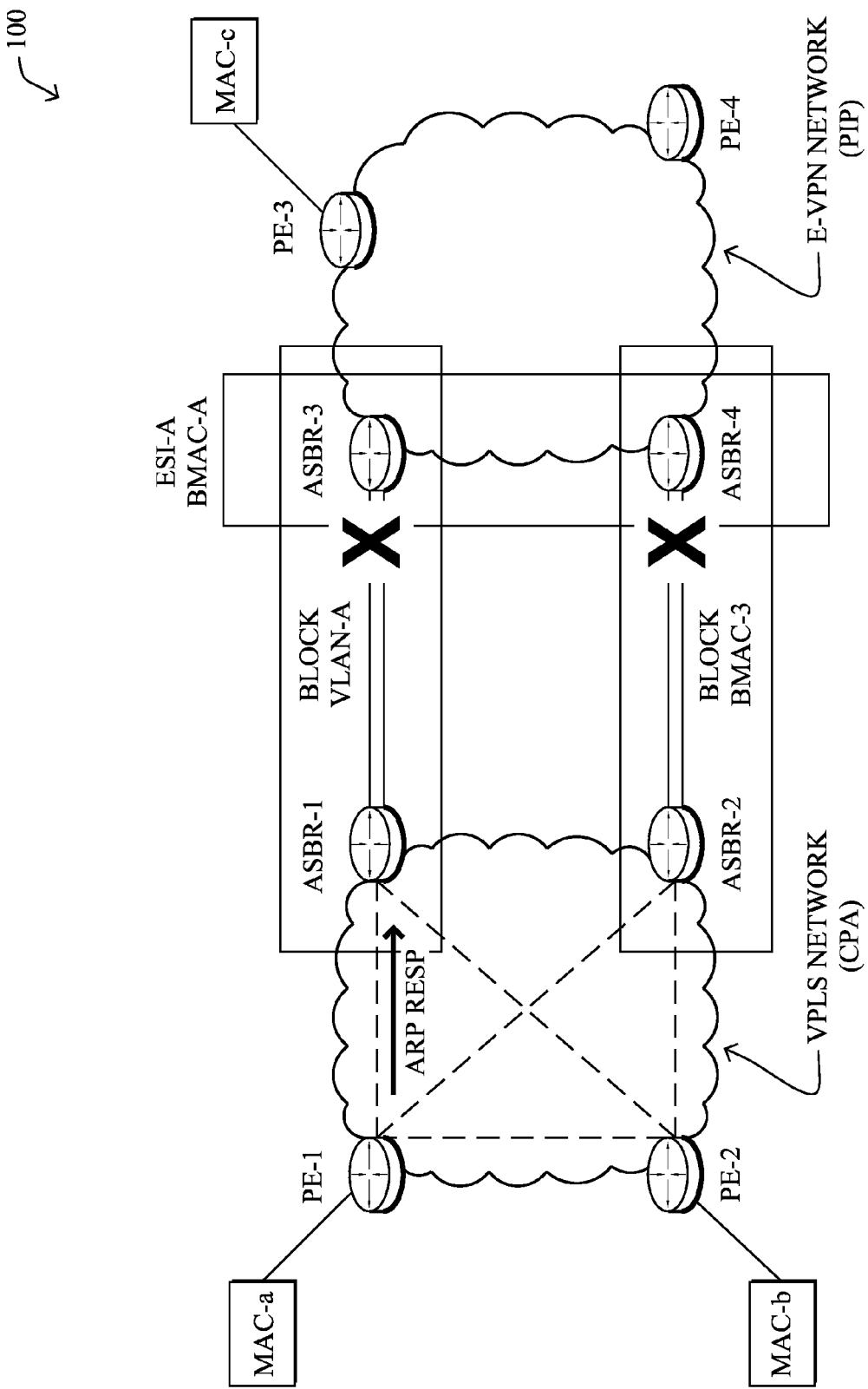
FIGS. 5A-5C illustrate an example ARP reply message passing.
Figure 5B:
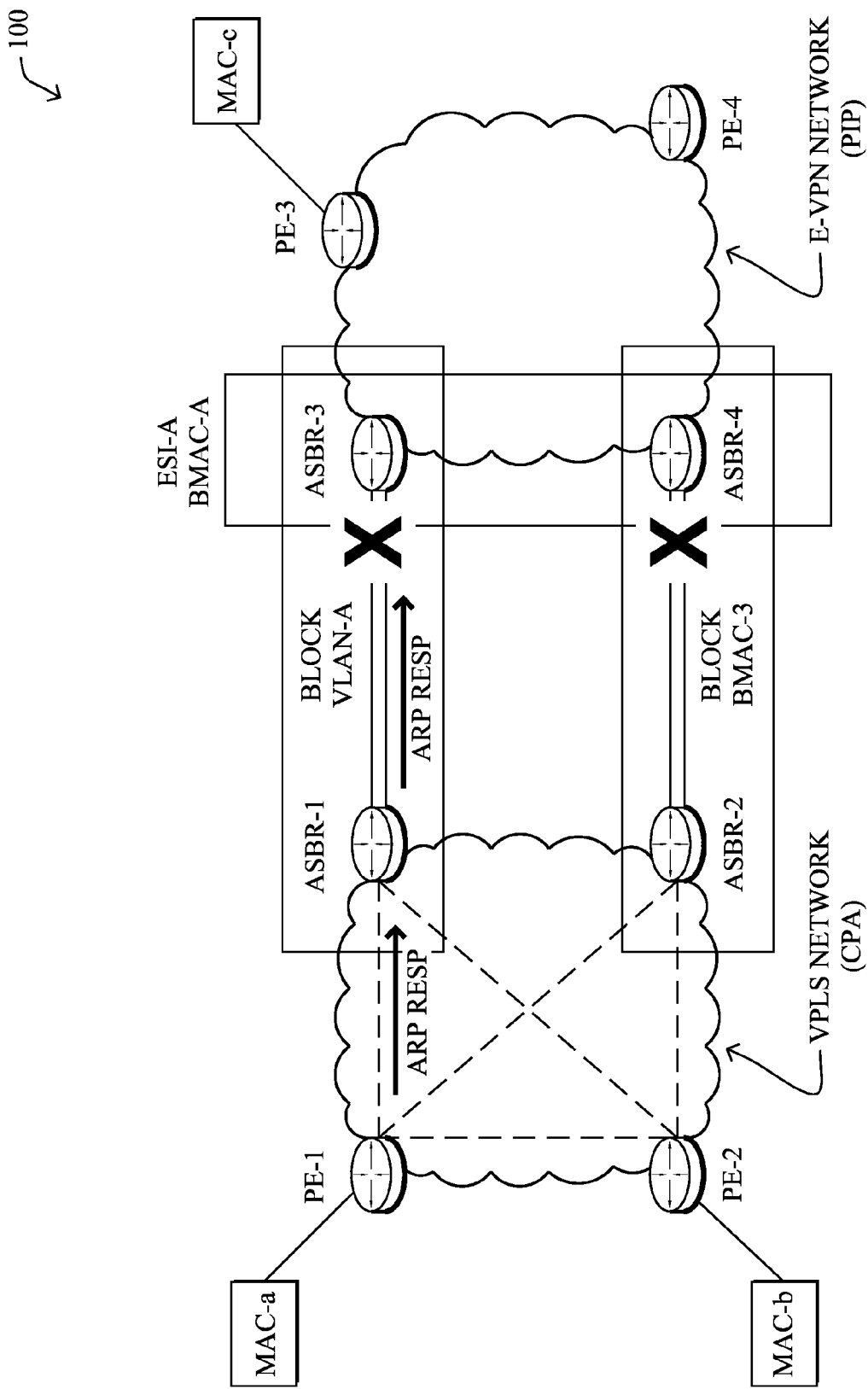
Figure 5C:
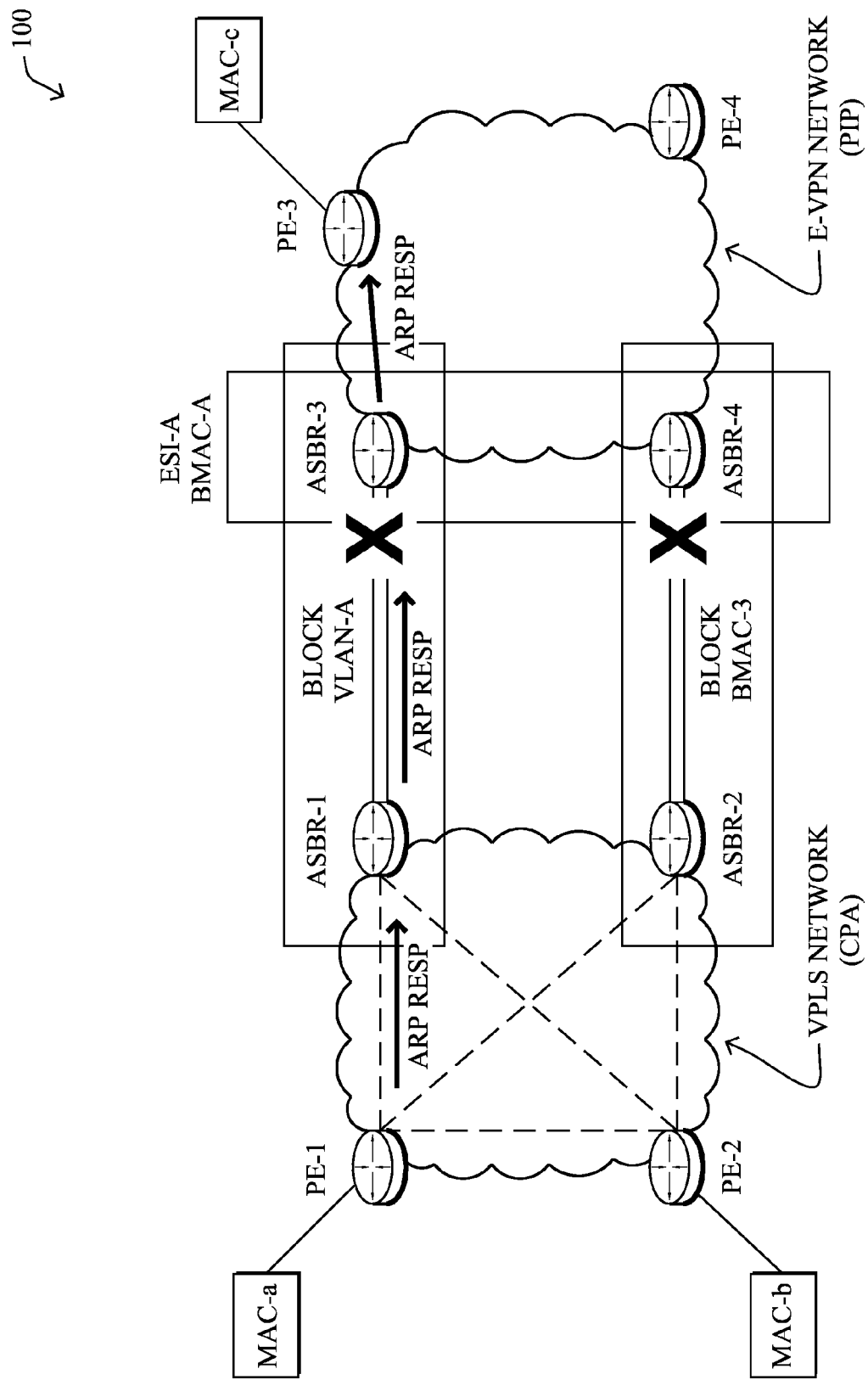

The techniques herein may be further illustrated with reference to FIGS. 4A-5C, where as shown in FIG. 4A, MAC-c (e.g., a customer edge or "CE" device) sends a broadcast ARP message received by both ASBR-3 and ASBR-4. Since PE-3 is farther to ASBR-4 than ASBR-3, ASBR-4 blocks BUM traffic with source BMAC originated from PE-3. The BUM traffic is forwarded by ASBR-3 to ASBR-1, as shown in FIG. 4B. ASBR-1 then floods the BUM traffic (ARP message) to PE-1 and PE-2, as shown in FIG. 4C. Accordingly, as shown in FIGS. 5A-5C, PE-1 sends all subsequent packets destined to MAC-c to ASBR-1. At the same time, PE-3 sends all subsequent packets destined to MAC-a to ASBR-3 assuming ASBR-3 has the best IGP metric for BMAC-a.

Figure 6:
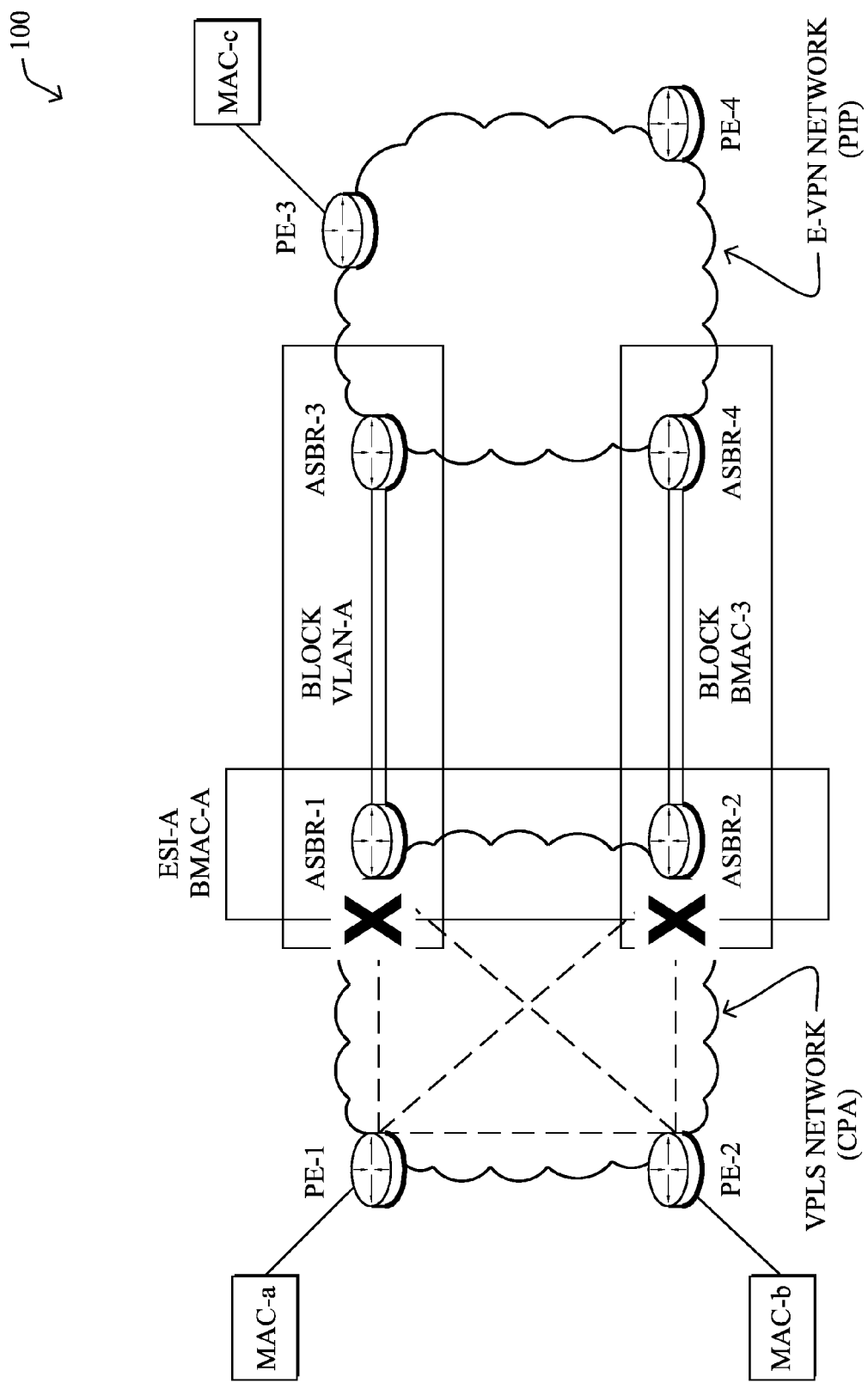
FIG. 6 illustrates another example designated forwarder configuration.
Figure 7A:
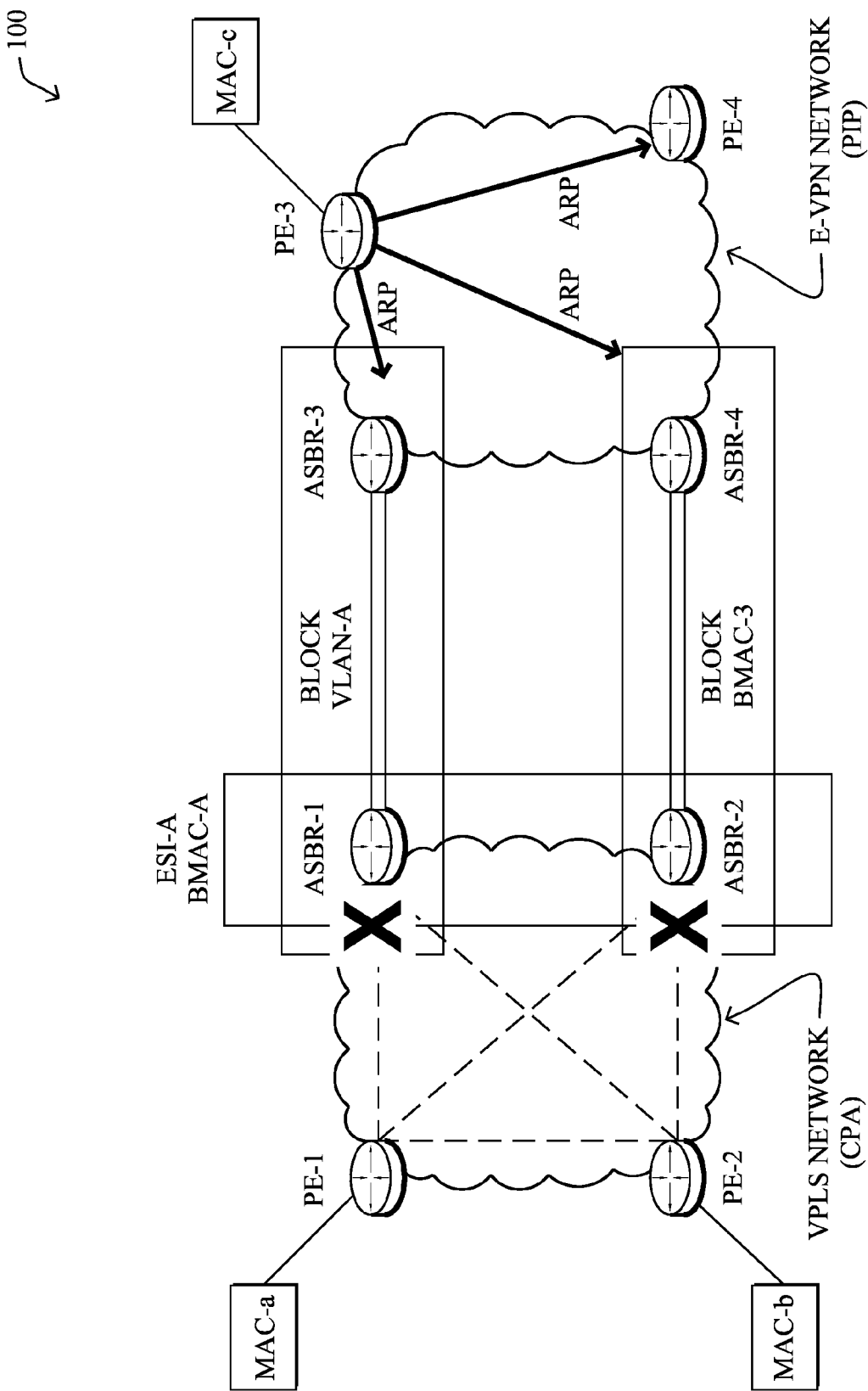
FIGS. 7A-7C illustrate another example ARP message passing.
Figure 7B:
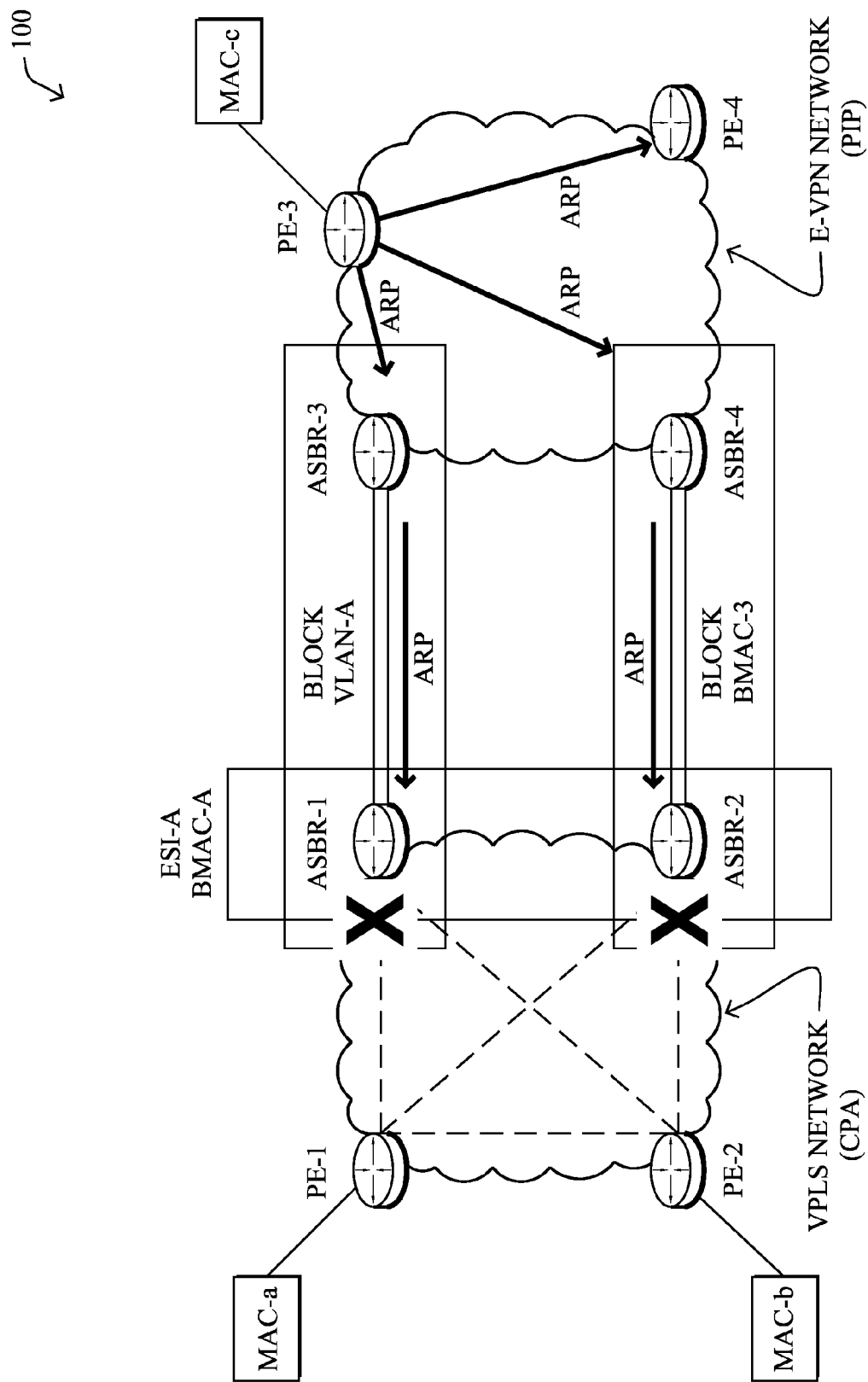
Figure 7C:
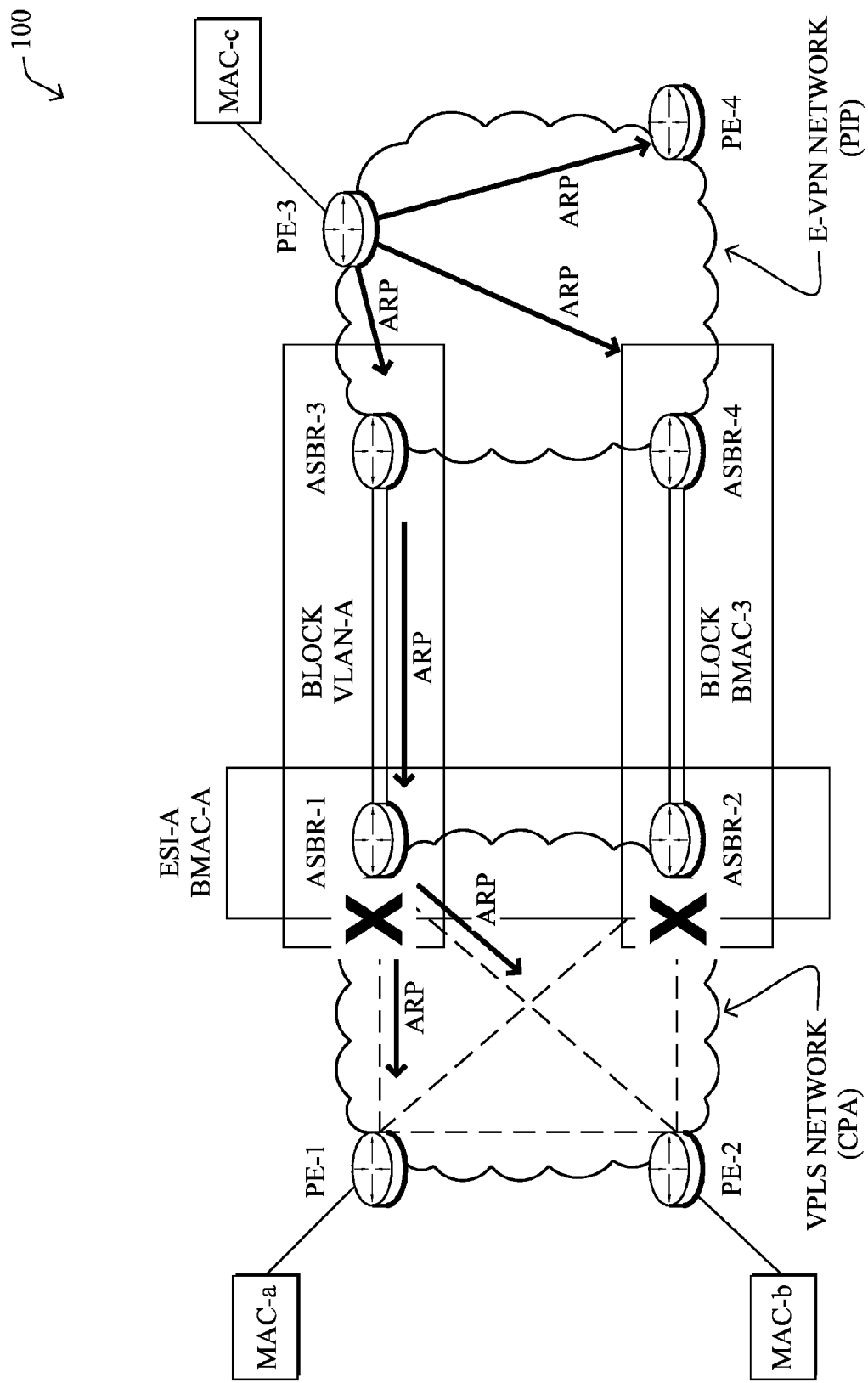
Figure 8A:
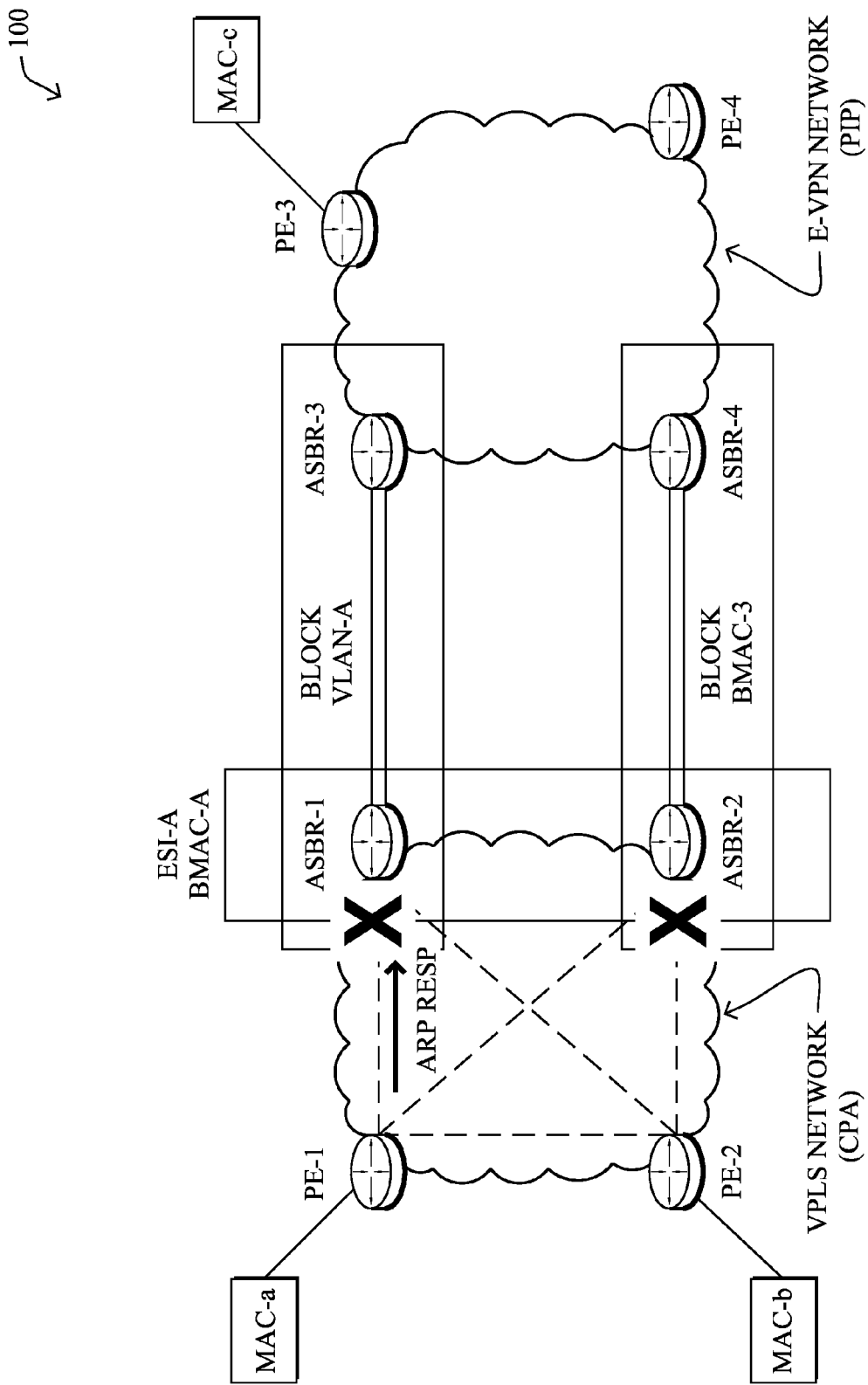
FIGS. 8A-8C illustrate another example ARP reply message passing.
Figure 8B:
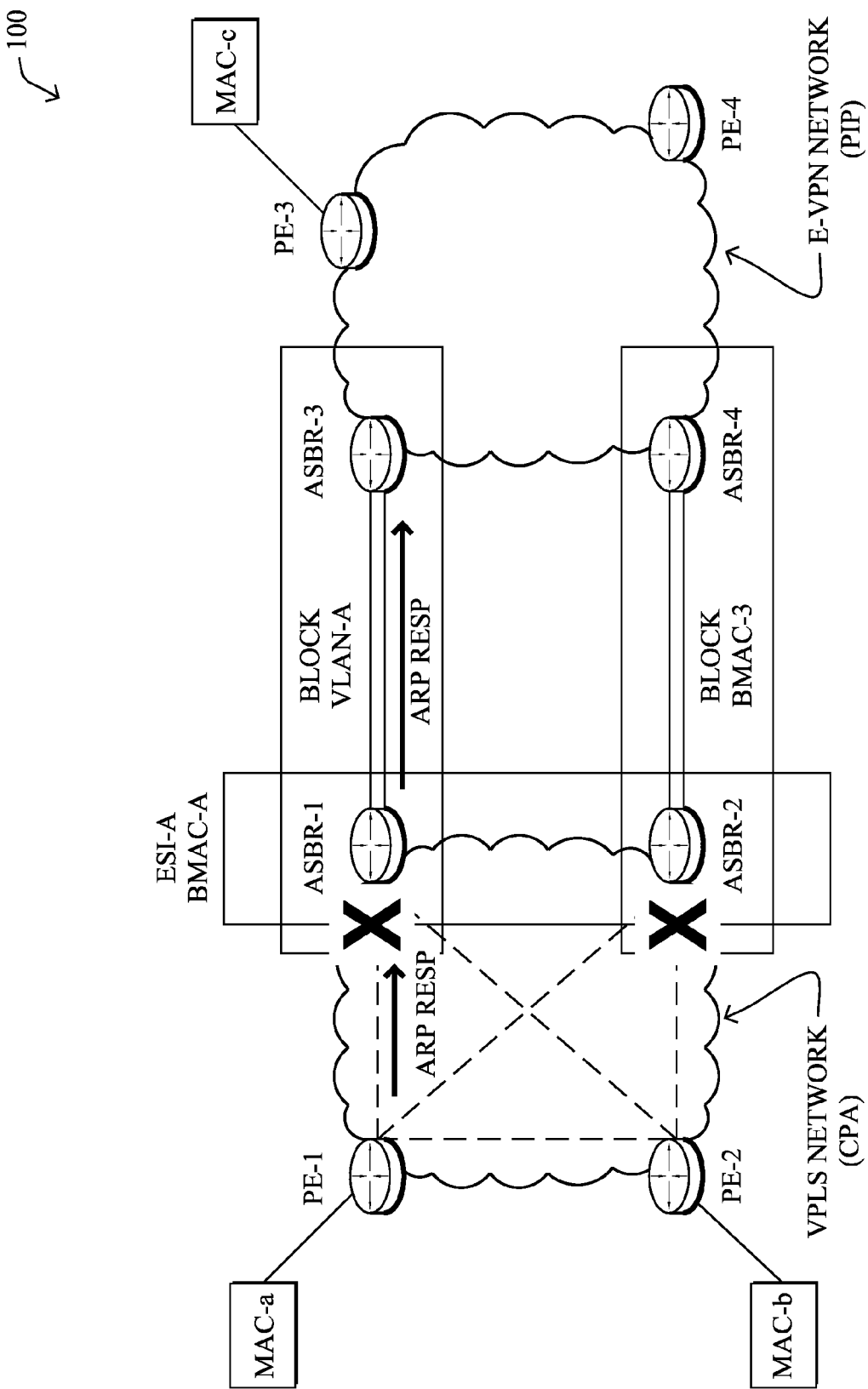
Figure 8C:
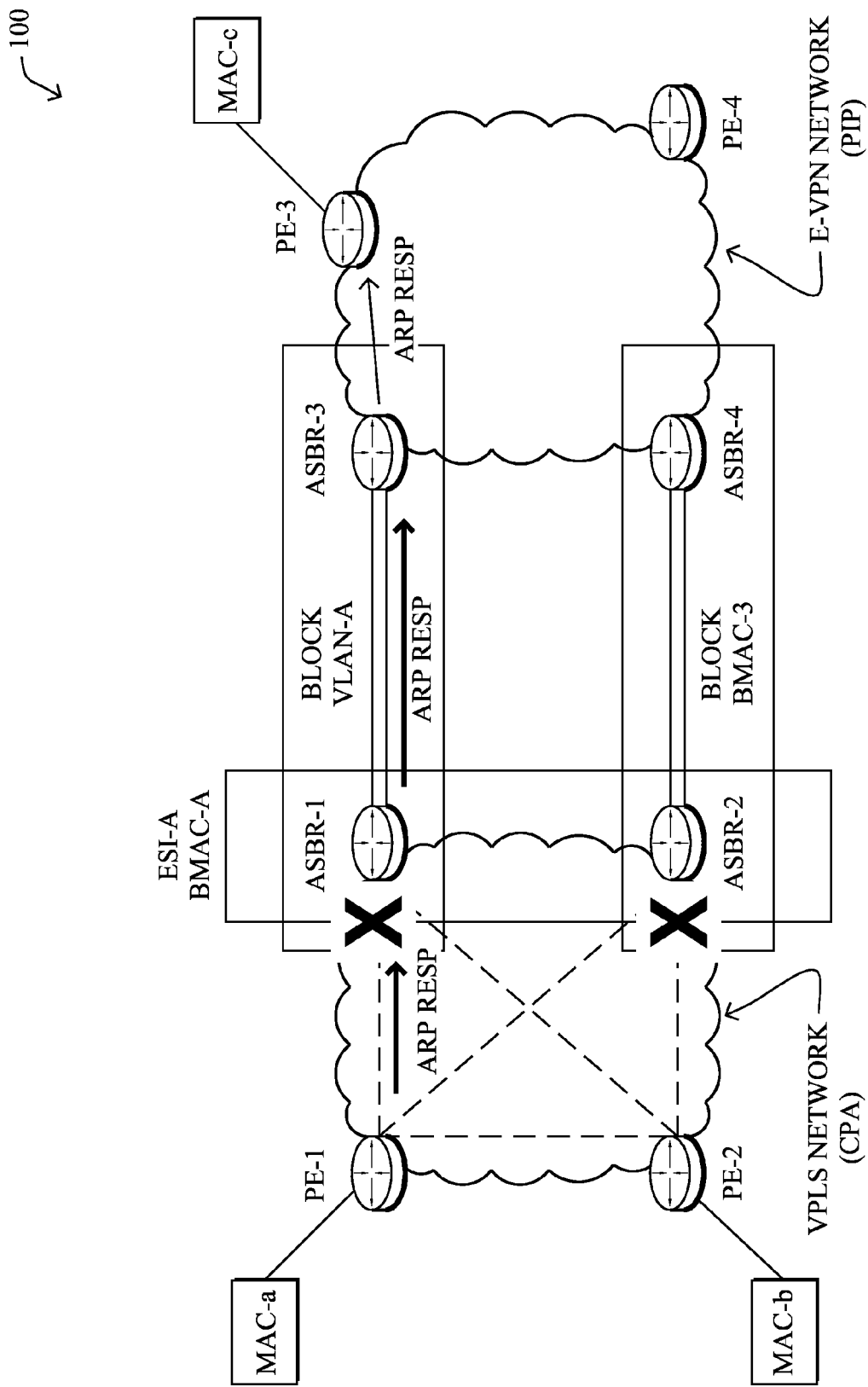

As an alternative example, FIG. 6 illustrates the instance where the network 100 is configured for PBB-EVPN integrated with VPLS. Again, blocking is performed asymmetrically—per BMAC for PBB-EVPN outbound traffic and per VLAN or ISID for PBB-EVPN inbound traffic. However, as shown in FIG. 6, ASBR-1 and ASBR-2 support both VPLS and PBB-EVPN and perform inter-operability between two. As such, the techniques herein may only need to perform service level provisioning on ASBR-1 and ASBR-2 with such an integrated solution, thus alleviating the need to perform service-level provisioning on ASBR-3 and ASBR-4. As shown in the sequence of FIGS. 7A-8C, therefore (similar to FIGS. 4A-5C explained above), ASBR-3 and ASBR-4 may act as a relay for PBB-EVPN BGP messages and traffic, and may remain transparent to multi-homing functions, including DF election.

Figure 9:
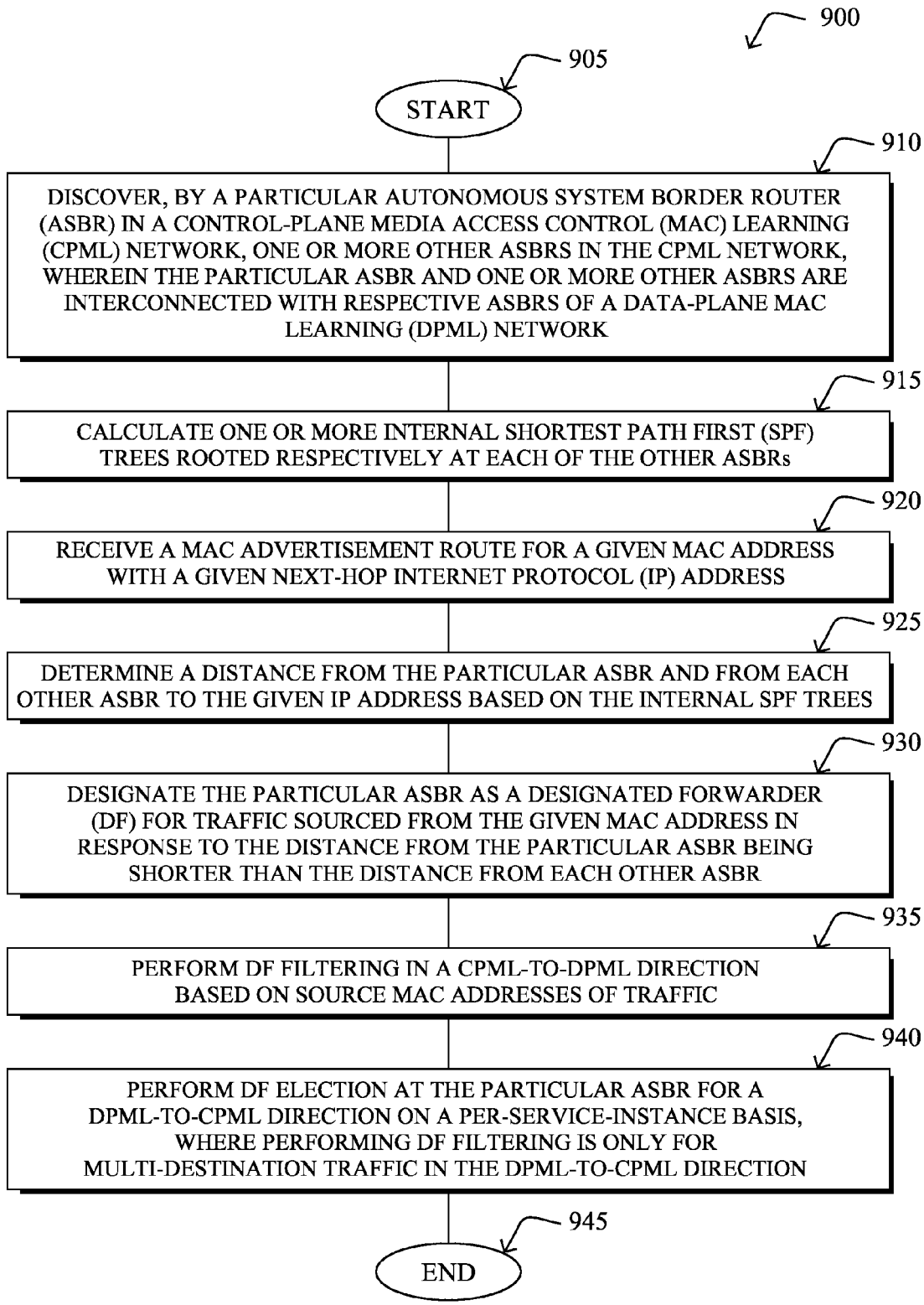
FIG. 9 illustrates an example simplified procedure for redundancy for inter-AS L2VPN service with optimal forwarding in accordance with one or more embodiments described herein.

FIG. 9 illustrates an example simplified procedure 900 for redundancy for inter-AS L2VPN service with optimal forwarding in accordance with one or more embodiments described herein. The procedure 900 may start at step 905, and continues to step 910, where, as described in greater detail above, a particular ASBR in a control-plane MAC learning (CPML) network 125 (e.g., a PBB-EVPN network) discovers one or more other ASBRs in the CPML network, where the particular ASBR and one or more other ASBRs are interconnected with respective ASBRs of a data-plane MAC learning (DPML) network 120 (e.g., a VPLS network). For instance, as mentioned above, discovering one or more other ASBRs in the CPML network may be based on E-VPN Ethernet segment routes. In step 915, the particular ASBR may calculate one or more internal SPF trees rooted respectively at each of the other ASBRs in the CPML network (e.g., based on IGP), such that upon receiving a MAC advertisement route for a given MAC address with a given next-hop IP address in step 920, the particular ASBR may determine a distance from the particular ASBR and from each other peer ASBR in the CPML network to the given IP address based on the internal SPF trees in step 925. In response to the distance from the particular ASBR being shorter than the distance from each other peer ASBR (e.g., a lower IGP cost), then in step 930 the particular ASBR may be designated as the DF for traffic sourced from the given MAC address (e.g., unicast or multi-destination traffic originating from the given MAC address). In step 935, DF filtering in a CPML-to-DPML direction may be performed based on source MAC addresses of traffic. Note also that according to the techniques herein, DF election at the particular ASBR for a DPML-to-CPML direction may be performed in step 940 on a per-service-instance basis, where performing DF filtering is only for multi-destination traffic in the DPML-to-CPML direction.

The procedure 900 illustratively ends in step 945, though with the ability to continue updating SPF trees, receiving MAC advertisements, receiving traffic on which to perform DF filtering, etc. It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for redundancy for inter-AS L2VPN service with optimal forwarding. In particular, the techniques herein support the interconnect of VPLS and (PBB)-EVPN domains with optimal forwarding, while ensuring MAC table stability within the VPLS PEs and also ensuring that no duplicate frame delivery occurs. That is, the techniques herein use an IGP metric to select the shortest path, and extend E-VPN forwarding mechanisms to ensure that known unicast and BUM traffic follow a congruent path for any given source B-MAC for L2VPN services (that employ symmetric link costs). Notably, the techniques described herein operate without requiring that a single edge device be responsible for forwarding traffic on a given VLAN (for both single-destination and multi-destination traffic), as do other current techniques which do not meet the requirements of optimal forwarding based on IGP distance.

While there have been shown and described illustrative embodiments that provide redundancy for inter-AS L2VPN service with optimal forwarding, it is to be understood that various other adaptations and modifications may be made within the spirit and scope of the embodiments herein. For example, the embodiments have been shown and described herein with relation to particular types of networks and associated protocols and terminology. However, the embodiments in their broader sense are not as limited, and may, in fact, be used with other types of networks and/or protocols, where suitable. For example, the use of VPLS and PBB-EVPN networks are merely one example implementation, and they are not meant to be limiting to the scope of the embodiments herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   discovering, by a particular autonomous system border router (ASBR) in a control-plane media access control (MAC) learning (CPML) network, one or more other ASBRs in the CPML network, wherein the particular ASBR and one or more other ASBRs are interconnected with respective ASBRs of a data-plane MAC learning (DPML) network;
   calculating one or more internal shortest path first (SPF) trees rooted respectively at each of the other ASBRs in the CPML network;
   receiving a MAC advertisement route for a given MAC address with a given next-hop Internet Protocol (IP) address;
   determining a distance from the particular ASBR and from each other ASBR in the CPML network to the given IP address based on the internal SPF trees; and
   in response to the distance from the particular ASBR being shorter than the distance from each other ASBR, designating the particular ASBR as a designated forwarder (DF) for traffic sourced from the given MAC address.

2. The method as in claim 1, further comprising:
   performing DF filtering in a CPML-to-DPML direction based on source MAC addresses of traffic.

3. The method as in claim 1, further comprising:
   performing DF election at the particular ASBR for a DPML-to-CPML direction on a per-service-instance basis; and
   performing DF filtering only for multi-destination traffic in the DPML-to-CPML direction.

4. The method as in claim 1, wherein the CPML network is a Provider Backbone Bridging (PBB) Ethernet virtual private network (PBB-EVPN) network.

5. The method as in claim 1, wherein the DPML network is a virtual private local area network (LAN) service (VPLS) network.

6. The method as in claim 1, wherein discovering one or more other ASBRs in the CPML network is based on Ethernet virtual private network (E-VPN) Ethernet segment routes.

7. The method as in claim 1, wherein calculating the one or more internal SPF trees is based on an Interior Gateway Protocol (IGP).

8. The method as in claim 7, wherein a shorter distance is determined based on lower IGP cost.

9. The method as in claim 1, wherein traffic sourced from the given MAC address is selected from a group consisting of:

unicast traffic originating from the given MAC address; and multi-destination traffic originating from the given MAC address.

10. An apparatus, comprising:
  one or more network interfaces to communicate within a control-plane media access control (MAC) learning (CPML) network as a particular autonomous system border router (ASBR), and to communicate with a respective ASBR of a data-plane MAC learning (DPML) network;
  a processor coupled to the network interfaces and adapted to execute one or more processes; and
  a memory configured to store a process executable by the processor, the process when executed operable to:
    discover one or more other ASBRs in the CPML network, wherein the one or more other ASBRs are interconnected with respective ASBRs of the DPML network;
    calculate one or more internal shortest path first (SPF) trees rooted respectively at each of the other ASBRs in the CPML network;
    receive a MAC advertisement route for a given MAC address with a given next-hop Internet Protocol (IP) address;
    determine a distance from the particular ASBR and from each other ASBR in the CPML network to the given IP address based on the internal SPF trees; and
    in response to the distance from the particular ASBR being shorter than the distance from each other ASBR, designate the particular ASBR as a designated forwarder (DF) for traffic sourced from the given MAC address.

11. The apparatus as in claim 10, wherein the process when executed is further operable to:
  perform DF filtering in a CPML-to-DPML direction based on source MAC addresses of traffic.

12. The apparatus as in claim 10, wherein the process when executed is further operable to:
  perform DF election for a DPML-to-CPML direction on a per-service-instance basis; and
  perform DF filtering only for multi-destination traffic in the DPML-to-CPML direction.

13. The apparatus as in claim 10, wherein the CPML network is a Provider Backbone Bridging (PBB) Ethernet virtual private network (PBB-EVPN) network, and wherein the DPML network is a virtual private local area network (LAN) service (VPLS) network.

14. The apparatus as in claim 10, wherein discovering one or more other ASBRs in the CPML network is based on Ethernet virtual private network (E-VPN) Ethernet segment routes.

15. The apparatus as in claim 10, wherein calculating the one or more internal SPF trees is based on an Interior Gateway Protocol (IGP).

16. The apparatus as in claim 15, wherein a shorter distance is determined based on lower IGP cost.

17. The apparatus as in claim 10, wherein traffic sourced from the given MAC address is selected from a group consisting of: unicast traffic originating from the given MAC address; and multi-destination traffic originating from the given MAC address.

18. A tangible, non-transitory, computer-readable media having software encoded thereon, the software when executed by a processor operable to:
  discover, for a particular autonomous system border router (ASBR) in a control-plane media access control (MAC) learning (CPML) network, one or more other ASBRs in the CPML network, wherein the particular ASBR and one or more other ASBRs are interconnected with respective ASBRs of a data-plane MAC learning (DPML) network;
  calculate one or more internal shortest path first (SPF) trees rooted respectively at each of the other ASBRs in the CPML network;
  receive a MAC advertisement route for a given MAC address with a given next-hop Internet Protocol (IP) address;
  determine a distance from the particular ASBR and from each other ASBR in the CPML network to the given IP address based on the internal SPF trees; and
  in response to the distance from the particular ASBR being shorter than the distance from each other ASBR, designate the particular ASBR as a designated forwarder (DF) for traffic sourced from the given MAC address.

19. The computer-readable media as in claim 18, wherein the software when executed is further operable to:
  perform DF filtering in a CPML-to-DPML direction based on source MAC addresses of traffic.

20. The computer-readable media as in claim 18, wherein the software when executed is further operable to:
  perform DF election at the particular ASBR for a DPML-to-CPML direction on a per-service-instance basis; and
  perform DF filtering only for multi-destination traffic in the DPML-to-CPML direction.

* * * * *